United States Patent Office 3,010,903
Patented Nov. 28, 1961

---

3,010,903
PHOSPHATE ADDITIVES FOR HYDROCARBON COMPOSITIONS
John V. Clarke, Jr., Cranford, N.J., John O. Smith, Jr., Swampscott, Mass., and John F. Kunc, Jr., Union, N.J., assignors to Esso Research and Engineering Company, a corporation of Delaware
No Drawing. Filed Nov. 1, 1957, Ser. No. 693,817
10 Claims. (Cl. 252—49.9)

This invention relates to alkylpolyoxyalkylene esters of phosphoric acid which are useful as additives to petroleum hydrocarbon materials. The invention also relates to liquid petroleum hydrocarbon compositions containing said esters, which compositions may also contain minor amounts of an alkyl primary amine and/or a partial ester of a polyhydroxy alcohol.

Alkylpolyoxyalkylene mono- and diesters of phosphoric acid have been found to be outstanding additives for normally liquid petroleum hydrocarbon compositions. However, they have only a limited solubility in the higher molecular weight hydrocarbon materials, such as heating oils and lubricating oils. It has been further found that by the addition of minor amounts of an alkyl primary amine and/or a partial ester of a polyhydric alcohol and a fatty acid, that the solubility of the phosphoric acid ester in the heavier hydrocarbons is greatly increased, so that it may be used in larger and more effective quantities.

The alkylpolyoxyalkylene mono- and diesters of phosphoric acid which may be used in the invention have the following general formulas:

$$R-[OR']_n-O\diagdown_{P=O} \text{ and } R-[OR']_n-O\diagdown_{P=O}$$
$$R-[OR']_n-O\diagup \quad \text{OH} \qquad HO\diagup \quad \text{OH}$$

wherein R represents an alkyl group containing 2 to 13, e.g. 4 to 10 carbon atoms; R' represents a divalent aliphatic hydrocarbon radical having 2 to 8, e.g. 2 to 4 carbon atoms and n is about 8 to 18. Also included are materials having different oxyalkylene groups in the same polymeric chain, e.g. oxyethylene and oxypropylene groups.

Specific examples of such materials will include:

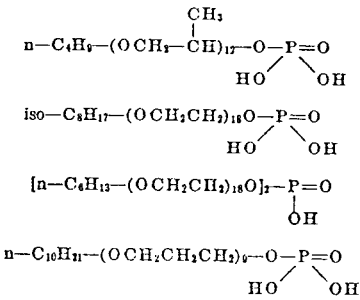

Materials of the above type are readily prepared by reacting $P_2O_5$ with an ether of a polyglycol. In these preparations it is generally desirable to slowly add the $P_2O_5$ to the polyglycol monoether with rapid stirring. After the desired amount of $P_2O_5$ is added, the mixture may then be heated to temperatures of about 300 to 400° F. for about 1 to 5 hours, preferably while bubbling nitrogen through the reaction mixture in order to provide agitation and to prevent oxidation.

The amine materials which are used as solubilizing agents for the phosphoric acid ester include tertiary alkyl primary amines of the general formula:

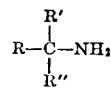

wherein R, R' and R" are straight or branched chain alkyl radicals of 1 to 18 carbon atoms; the total number of carbon atoms in the molecule being about 12 to 24. These amines can be prepared from tertiary olefins, e.g. the various polymers of propylene and isobutene; copolymers of propylene and isobutene; copolymers of isobutene and butenes or pentenes; etc. Such polymers and copolymers are well known synthetic olefins in the petroleum industry. However, in such polymerizations, various isomerizations and migrations may occur such that a mixture of olefins are produced. Thus, a tertiary alkyl primary amine prepared from tri-isobutene may contain tertiary alkyl primary amines of 13, 14 and/or 15 carbon atoms as well as the predominant one of 12 carbon atoms. Similarly, when making a tertiary alkyl primary amine of 18 carbon atoms from hexapropylene, a polymer of propylene, one may obtain a mixture of tertiary alkyl primary amines having predominantly 18 carbon atoms per molecule with minor amounts of homologous molecules with 19, 20, 21, 22, 23 and/or 24 carbon atoms. Such a mixture is conveniently designated "t-$C_{18-24}H_{37-49}NH_2$."

Specific examples of tertiary alkyl primary amines which may be used include the following:

3-amino-3,5,8-trimethyl-nonane
5-amino-5,13-dimethyl-hexadecane
3-amino-3,5,7,9,12-pentamethyl-tridecane
4-amino-2,4,6,8,10-pentamethyl-tridecane
2-amino-2,4,4,6,6,8,8-heptamethyl-nonane
6-amino-2,2,4,4,6,8,8-heptamethyl-nonane The partial esters of the polyhydroxy alcohol useful for solubilizing the phosphate ester include $C_{12}$ to $C_{22}$ fatty acid partial esters of aliphatic polyhydric alcohols having about 3 to 8 carbon atoms, and about 3 to 6 hydroxy groups per molecule. Preferred materials are the mono- and diesters of $C_3$ to $C_6$ alcohols having 3 to 6 hydroxyl groups which are prepared from $C_{12}$ to $C_{18}$ fatty acids. The above type of partial esters include the partial esters of the mono-dehydrated aliphatic polyhydric alcohols which are described in U.S. Patent 2,434,490 as well as partial esters of non-dehydrated aliphatic polyhydric alcohols. Specific examples of these partial esters include: sorbitan monooleate, glyceryl monooleate, pentaerythritol monooleate, the dioleates of sorbitan, mannitan, pentaerythritol and related polyhydric alcohols, the corresponding partial stearic, lauric, and palmitic acid esters of these alcohols, and partial esters of these alcohols made from mixtures of these fatty acids. Preferred materials are the monooleates of sorbitan and pentaerythritol.

The normally liquid petroleum hydrocarbon materials, with which the phosphoric acid ester may be used as an additive, may range from gasoline through heavy lubricating oil. Such hydrocarbon materials will therefore include aviation, marine and automotive or motor gasolines;

aviation turbo fuels, such as JP-1, JP-4 and JP-5 fuels; marine, stationary and automotive diesel fuels; domestic and industrial fuel oils and lubricating oils.

The liquid engine fuels, i.e. gasolines and diesel fuels, will comprise at least 95 wt. percent of a mixture of hydrocarbons with a boiling range of about 75° F. to 750° F., and will have a viscosity of about 0.264 to 26.4 centistokes at 77° F. This includes motor gasolines having boiling ranges of 75° F. to 540° F. and viscosities of 0.264 to 1.0 centistoke at 100° F., aviation turbo fuels whose volatility is such that the end point does not exceed 572° F. and whose viscosity is between 0.5 and 1.5 centistokes at 100° F., diesel fuels which boil between about 250° F. to 750° F. and have viscosities of 1.4 to 26.4 centistokes at 100° F. The fuel oils include gas oils which are petroleum distillates intermediate in volatility between kerosene and lubricating oil and which may include cracked hydrocarbon stocks. The lubricating oils will include those oils of about 30 to 350 SUS viscosity at 210° F.

The compositions of the invention will therefore comprise a normally liquid petroleum hydrocarbon and about .005 to 5.0, e.g. .01 to 2.5 wt. percent, of the phosphoric acid ester. In hydrocarbon oils, such as fuel oils and lubricating oils, where the phosphate normally has only a limited solubility, then the composition may also contain about 50 to 300 wt. percent, e.g. 75 to 200 wt. percent, based on the weight of the phosphoric acid ester, of a solubilizing agent. The solubilizing agent in turn may consist entirely of the tertiary alkyl primary amine or of the partial ester of a polyhydroxy alcohol. However, best results are generally obtained by using a blend consisting of about 30 to 80 wt. percent of the tertiary alkyl primary amine and about 70 to 20 wt. percent of the partial ester. Not only does the amine and/or partial ester increase the solubility of the phosphate in the oil, but they also enhance its effectiveness as well as being useful additives in their own right.

Various other conventional additives may also be added to the compositions of the invention. Examples of such additives include: detergents, viscosity index improvers, corrosion inhibitors, pour depressants, dyes, and the like.

The invention will be further understood by the following examples:

EXAMPLE I

*Preparation of the phosphate additive*

A mixed phosphate consisting primarily of n-butyl (polyoxypropylene)$_{12}$ dihydrogen phosphate with a minor amount of n-butyl (polyoxypropylene)$_{12}$ monohydrogen phosphate was prepared as follows:

4 wt. percent of P$_2$O$_5$ was slowly added with rapid stirring to 96 wt. percent of an ether alcohol of the formula:

$$\text{n--C}_4\text{H}_9\left[\text{OCH}_2\text{--CH} \atop \text{CH}_3\right]_{12}\text{--OH}$$

After all the P$_2$O$_5$ was added, the mixture was heated to about 300° F. for about 3 hours, while bubbling nitrogen through the mixture in order to provide agitation and prevent oxidation. The reaction mixture was cooled and analyzed and was found to contain about 50 wt. percent of the unreacted ether alcohol and about 50 wt. percent of n-butyl (oxypropylene)$_{12}$ phosphate having a molecular weight of 889. The molecular weight of 889 indicates that the n-butyl polyoxypropylene phosphate material was predominately the dihydrogen phosphate:

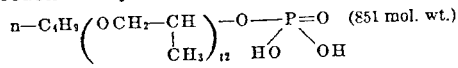

with a minor amount of the monohydrogen phosphate:

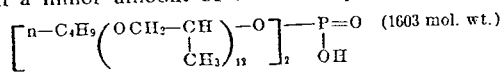

0.5 wt. percent and 4.0 wt. percent of the above reaction product were respectively mixed with a 5W-20 lubricating base oil. This base oil was a neutral, extracted Mid-Continent mineral lubricating oil containing a minor amount of polymethacrylate as a viscosity index improver. The mixtures were then tested in the 4-ball E.P. test for load-carrying ability and the results of these tests are summarized in the following table:

TABLE I

| Wt. Percent Additive Added to Base Oil | Percent Phosphorus in Oil | 4-Ball E. P. Test (load-carried in kg.) |
|---|---|---|
| None | 0 | 50 |
| 0.5 wt. percent $^1$ of solution containing 50 wt. percent n-butyl(oxypropylene)$_{12}$ phosphate | .02 | 85 |
| 4.0 wt. percent $^2$ of solution containing 50 wt. percent n-butyl (oxypropylene)$_{12}$ phosphate | .16 | 117 |

$^1$ Maximum quantity that could be put in solution.
$^2$ Additive partly dissolved and partly suspended.

As seen from the above table, the additive material (product of Example I) which consisted of a 50 wt. percent solution of n-butyl (oxypropylene)$_{12}$ mono- and dihydrogen phosphate in n-butyl ether of polypropylene glycol was very effective as a load-carrying agent. Actually, this improvement was due solely to the phosphate, the ether glycol material being inert. It is also to be noted that the additive material was soluble in the oil only to the extent of 0.5 wt. percent, although larger quantities can be suspended to impart even higher load-carrying ability to the oil.

In order to increase the amount of phosphate which can be dissolved in the oil and thereby increase its effectiveness, the amine and/or the partial ester of a polyhydric alcohol can be used as solubilizing agents. This is illustrated by the following examples:

EXAMPLE II

A. An additive mixture was prepared by mixing 50 wt. percent of the phosphoric acid ester material of Example I (solution containing 50 wt. percent n-butyl (oxypropylene)$_{12}$ phosphate) with 25 wt. percent of sorbitan monooleate (Span 80) and 25 wt. percent of a commercial mixture of C$_{18}$ to C$_{24}$ tertiary alkyl primary amines (Primene JM-T). This additive mixture was diluted with 90 wt. percent of a neutral mineral lubricating oil having a viscosity of 43 SUS at 210° F. A clear solution resulted which did not separate upon standing.

B. An additive mixture was prepared by mixing 50 wt. percent of the n-butyl polypropoxy material with 50 wt. percent of Primene JM-T. 10 wt. percent of this mixture when added to 90 wt. percent of mineral oil (same as in A) resulted in a solution having a slight haze.

C. Example II-B was repeated except that 50 wt. percent of sorbitan monooleate was used in place of the 50 wt. percent of Primene JM-T. 10 wt. percent of this additive mixture, when added to the 90 wt. percent mineral oil resulted in a solution having a distinct haze.

As seen from above, the mixture of the amine and phosphate material, when added to the mineral oil (Example II-B) resulted in a slight haze. A more distinct haze resulted when the sorbitan monooleate was used with the phosphate instead of the amine (Example II-C). However, by using both the amine and the sorbitan monooleate (Example II-A) a clear solution resulted. Thus, while either the amine or the fatty acid partial ester of a polyhydroxy alcohol will solubilize the phosphate, the best results are obtained by using a mixture of such solubilizing materials.

The composition of Example II-A was tested for load-carrying ability. The results of these tests are summarized in the following table, along with the results of the similar tests run on the base oil per se and on the base oil containing 5 wt. percent of the phosphate material, the bulk of which was in suspension due to its limited solubility.

TABLE II

| Run | Composition | Load Carried (kg.) 4-Ball E.P. Test | Load Carried (lbs.) SAE Machine |
|---|---|---|---|
| 1 | 100% Mineral Oil (43 SUS. at 210° F.) | 42 | 82 |
| 2 | 95% Mineral Oil (43 SUS. at 210° F.) +5% of solution containing 50 wt. percent n-butyl(oxypropylene)₁₂ phosphate. | 95 | 127 |
| 3 | 90% Mineral Oil (43 SUS. at 210° F.), 5% of a solution containing 50 wt. percent n-butyl (oxypropylene)₁₂ phosphate, 2.5% sorbitan monooleate, 2.5% mixture of C₁₈₋₂₄ t.-alkyl primary amines. | 88 | 146 |

As seen from Table II, the addition of 5 wt. percent of the phosphate material (about 0.5 wt. percent of which was in solution, the remainder being suspended in the oil) materially increased the load-carrying ability of the oil (compare runs 1 and 2). However, the suspended portion of the phosphate will quickly settle. Run 3, however, represents a stable solution of the phosphate and which had substantially the same load-carrying ability as run 2, showing a slightly better result in the SAE machine and being slightly less effective in the 4-ball test.

In addition to its load-carrying ability, the materials of the invention represent valuable additives for fuel oils. This is illustrated by the following examples:

EXAMPLE III

A composition was prepared consisting of 0.05 wt. percent of the reaction product of Example I which contained 50 wt. percent of n-butyl polyoxypropylene phosphate in solution in an inert solvent; 0.025 wt. percent of sorbitan monooleate; and 0.025 wt. percent of the $C_{18-24}$ tertiary alkyl primary amine material (Primene JM-T) in a No. 2 heating oil. This heating oil was a blend of equal parts by weight of a virgin gas oil and a catalytically-cracked gas oil. The composition was tested for sediment forming tendencies by heating for 16 hours at 210° F., followed by filtering to determine the amount of sediment formed. The results of this test are reported in Table III, which follows, along with sedimentation values for the base fuel oil and blends of the base fuel oil with the phosphate material per se and with the solubilizing agents per se.

TABLE III

| Wt. Percent Additive added to Heating Oil | Sediment (mg./100 ml.) |
|---|---|
| None | 4 |
| 0.10% of a solution of 50 wt. percent n-butyl (oxypropylene)₁₂ phosphate | 10 |
| .05% sorbitan monooleate, .05% C₁₈₋₂₄ tertiary alkyl primary amines | 2 |
| .05% of a solution of 50% n-butyl (oxypropylene)₁₂ phosphate, .025% sorbitan monooleate, .025% C₁₈₋₂₄ tertiary alkyl primary amines | 1 |

As demonstrated above, the use of the three component additive mixture of phosphate, sorbitan monooleate and amine was more effective in reducing the formation of sediment than would have been expected from the individual effect of the components.

EXAMPLE IV

A composition was prepared similar to that of Example III, except that a different proportion of the additives was used.

The above composition was tested for emulsifying ability in a modified Hershel emulsion test, which was carried out as follows: 40 ml. of the fuel oil composition under test was mixed with 40 ml. of distilled water and then placed in a constant temperature bath until the mixture reached 77° F. The mixture was then stirred with a propeller type mixer rotating at 1500 r.p.m. for five minutes, and then allowed to stand for one hour. The volume of the oil layer, the water layer and the emulsion layer was then measured.

The composition was also tested for rusting characteristics by suspending polished steel strips in a two-phase system of the fuel oil composition and water, and then bubbling air through the system. The steam emulsion number of the fuel oil composition was also determined according to ASTM D157-51-T test method.

Results of the preceding tests are given in Table IV, along with comparable data on the uninhibited base oil, and a commercial fuel oil composition.

TABLE IV

| | Hershel Emulsion Test | | | Rust Test | | Steam Emulsion No. |
|---|---|---|---|---|---|---|
| | Oil Vol. | Water Vol. | Emulsion Vol. | Oil Layer | Water Layer | |
| 1. Base Oil | 42 | 32 | 7 | trace | heavy | 19 |
| 2. Inhibited Commercial Fuel Oil | 32 | 20 | 27 | trace | heavy | 128 |
| 3. Base oil+.01% Sorbitan monooleate, .01% Tert. C₁₈₋₂₄ alkyl primary amines, .02% of 50% solution of n-butyl polypropoxy phosphate. | 42 | 39 | 0 | none | trace | 33 |

The data in Table IV shows that the additive combination of the invention represents an excellent fuel oil additive giving good rust inhibition and having little tendency to emulsify water into the oil.

EXAMPLE V

To demonstrate the advantage of the phosphate in a gasoline, the following experiment was performed:

0.1 wt. percent of the n-butyl polyoxypropylene phosphate product material of Example I, was added to a high octane gasoline containing 0.27% sulfur. This gasoline contained 2.5 cc. of tetraethyl lead per gallon and had an end-point of about 390° F. (ASTM D-86). The inhibited gasoline was then tested in a single cylinder Lauson spark-ignited gasoline engine equipped with a radioactive top piston ring.

Each test consisted of a series of five 5-minute runs with a 30 minute shutdown between each run. During the shutdown, cooling water was run through the jacket, bringing the jacket water-out temperature to 60° F. Each five minute run therefore began at 60° F. No cooling was used during the five minute run and the water-out temperature was allowed to reach its own level, which was 100°±1° F. at the end of the run. Two series of runs were made each day, one a reference run on reference fuel and the other a test run on reference fuel plus the additive. Before either the reference or test run, the engine was run for five minutes on the fuel to be tested in order to wet-down the engine. These five minute wet-down runs were at a higher temperature than the series of cyclic five minute runs which constituted the reference or test runs. Following the wet-down, there was a 30 minute shutdown after which the reference or test run began. Each run was made on a fresh charge of summer grade mineral oil containing no additives. A load of 1.6 BKW. and a speed of 1800 r.p.m. were maintained throughout the program.

At the end of each run, the oil charge was drained and dip counted with a scintillation counter in order to determine the amount of iron which had been worn off the radioactive top compression ring into the crankcase lube oil.

Each wear measurement was repeated at least six times and the average results are given below, along with comparable wear data on the uninhibited gasoline.

| Amount of Additive | Top Ring Wear, percent of reference |
|---|---|
| None | 100 |
| 0.1% n-butyl(oxypropylene)₁₂ phosphate (34% active ingredient) | 82 |

Although, for convenience, the phosphate material used in the preceding examples was in the form of a solution in n-butyl monoether of polypropylene glycol, similar compositions can be prepared by using a pure phosphate material. Thus, the phosphate portion of the reaction product of Example I can be separated from the unreacted polypropylene glycol monoether by simple extraction and used directly.

A. A lubricating oil composition is prepared by mixing 4.0 wt. percent of n-butyl (oxypropylene)₁₂ dihydrogen phosphate having the formula:

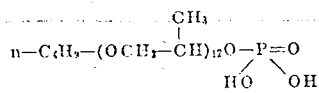

with 96.0 wt. percent of a mineral lubricating oil having a viscosity of 80 SUS at 210° F.

B. A fuel oil composition is prepared by mixing 1.0 wt. percent of n-octyl (oxyethylene)₁₈ monohydrogen phosphate having the formula:

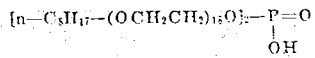

with 99.0 wt. percent of a No. 2 fuel oil of the type described in Example III.

C. A gasoline composition is prepared by mixing .10 wt. percent of n-butyl (oxypropylene)₁₂ dihydrogen phosphate into a motor gasoline having a viscosity of .5 centistoke at 100° F.

While the alkylpolyoxyalkylene mono- and diesters of phosphoric acid can be used in amounts of .005 to 5.0 wt. percent in petroleum hydrocarbons, generally about .005 to 1.0 weight percent will be used in gasolines and heating oils, while 0.5 to 5.0 wt. percent will be used in lubricating oils.

As previously mentioned, other additives may also be used in conjunction with the alkylpolyoxyalkylene esters of phosphoric acid to further enhance their effectiveness. One such additive is a copolymer consisting of 80 wt. percent "Lorol B" methacrylate and 20 wt. percent of β-diethyl aminoethyl methacrylate, as described in U.S. Patent 2,737,452. The "Lorol B" refers to a technical lauryl alcohol. Thus, a kerosene composition was prepared containing 0.0025 wt. percent of the above copolymer in combination with 0.0075 wt. percent of a mixture of C₁₂ to C₁₅ tertiary alkyl primary amines prepared from tri-isobutene and 0.01 wt. percent of the phosphate reaction product of Example I. This kerosene composition was found particularly useful as a jet fuel since the additive combination increased the thermal stability of the kerosene and reduced its deposit forming tendencies upon combustion. Another useful additive is morpholine, which can be used in combination with the phosphoric acid ester in leaded gasolines. The preceding are intended to merely illustrate the use of other additives in combination with the alkylpolyoxyalkylene esters of phosphoric acid of the invention, it being understood, of course, that still other additive materials may thus be used.

What is claimed is:

1. A liquid petroleum hydrocarbon composition comprising a major proportion of a normally liquid petroleum hydrocarbon selected from the group consisting of lubricating oils, and gasoline and about .005 to 5.0 wt. percent of a phosphate selected from the group consisting of alkylpolyoxyalkylene mono- and diesters of phosphoric acid, wherein said alkyl groups contain 2 to 13 carbon atoms, said oxyalkylene groups each contain 2 to 8 carbon atoms, and the number of said oxyalkylene groups per ester group is about 8 to 18.

2. A composition according to claim 1 wherein said petroleum hydrocarbon is gasoline.

3. A composition according to claim 1 wherein said petroleum hydrocarbon is a lubricating oil.

4. A composition according to claim 1 wherein said ester of phosphoric acid is an n-butyl polyoxypropylene phosphate.

5. A composition according to claim 4, wherein said phosphate is n-butyl (oxypropylene)₁₂ phosphate.

6. A composition of matter consisting essentially of a major proportion of a normally liquid petroleum hydrocarbon, about 0.005 to 5.0 wt. percent of a phosphate selected from the group consisting of alkylpolyoxyalkylene mono and diesters of phosphoric acid, wherein said alkyl groups contain 2 to 13 carbon atoms, said oxyalkylene groups each contain 2 to 8 carbon atoms, and the number of said oxyalkylene groups per ester group is about 8 to 18, about 50 to 300 wt. percent, based on the weight of said ester of phosphoric acid, of a material selected from a group consisting of tertiary alkyl primary amines containing 12 to 24 carbon atoms per molecule and C₁₂ to C₂₂ fatty acid partial esters of aliphatic polyhydric alcohols having about 3 to 8 carbon atoms and about 3 to 6 hydroxy groups per molecule, and mixtures thereof.

7. A composition according to claim 6 wherein said petroleum hydrocarbon is a fuel oil.

8. A liquid petroleum hydrocarbon composition comprising a major proportion of a normally liquid petroleum hydrocarbon selected from the group consisting of lubricating oils, and gasolines and about 0.05 to 5.0 wt. percent of alkylpolyoxypropylene monoester of phosphoric acid, wherein said alkyl group contains 2 to 13 carbon atoms, and the number of oxypropylene groups is about 8 to 18.

9. A composition according to claim 8, which also contains alkyl monoether of polypropylene glycol in an amount equal to the amount of said monoester, wherein the alkyl group of said monoether corresponds to the alkyl group of said monoester, and the number of propylene oxide groups in said monoether corresponds to the number of propylene oxide groups in said monoester.

10. A method of preparing alkylpolyoxyalkylene mono- and diesters of phosphoric acid, wherein said alkyl group contains 2 to 13 carbon atoms, said oxyalkylene group contains 2 to 8 carbon atoms and the number of said oxyalkylene groups per ester group is about 8 to 18, which comprises reacting P₂O₅ with in excess of 2 molar proportions of a monoether of a polyglycol per molar proportion of said P₂O₅, at temperatures of about 300 to 400° F. for about 1 to 5 hours.

References Cited in the file of this patent

UNITED STATES PATENTS

| 2,080,299 | Benning et al. | May 11, 1937 |
| 2,477,220 | Volz et al. | July 26, 1949 |
| 2,723,237 | Ferrin | Nov. 8, 1955 |
| 2,750,342 | Mikeska et al. | June 12, 1956 |
| 2,934,500 | Cantrell et al. | Apr. 26, 1960 |

OTHER REFERENCES

Davey: "Extreme Pressure Lubricants," Ind. and Eng. Chem., vol. 42, No. 9, page 1841, September 1950.

"Tertiary Alkyl Primary Amines," Rohm and Haas Co., September 1954, page 16.

"Atlas Surface Active Agents," Atlas Powder Co., Wilmington, Del., 1950, page 28.